(12) United States Patent
Takahashi et al.

(10) Patent No.: US 11,590,594 B2
(45) Date of Patent: Feb. 28, 2023

(54) LOWER GUIDE UNIT OF ELECTRICAL DISCHARGE MACHINE

(71) Applicant: Sodick Co., Ltd., Kanagawa (JP)

(72) Inventors: Jun Takahashi, Yokohama (JP); Yasuhiko Fujisawa, Yokohama (JP); Yuzo Dohi, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 344 days.

(21) Appl. No.: 17/022,426

(22) Filed: Sep. 16, 2020

(65) Prior Publication Data

US 2021/0129244 A1    May 6, 2021

(30) Foreign Application Priority Data

Oct. 30, 2019   (CN) .......................... 201911043656.0

(51) Int. Cl.
| | |
|---|---|
| *B23H 1/04* | (2006.01) |
| *B23H 7/26* | (2006.01) |
| *B23H 1/08* | (2006.01) |
| *B23H 11/00* | (2006.01) |

(52) U.S. Cl.
CPC ................. *B23H 1/04* (2013.01); *B23H 1/08* (2013.01); *B23H 11/003* (2013.01)

(58) Field of Classification Search
CPC ...................................................... B23H 7/265
See application file for complete search history.

(56) References Cited

U.S. PATENT DOCUMENTS

| 5,420,388 A | 5/1995 | Girardin |
| 6,448,528 B1 * | 9/2002 | Yoshida ................... B23H 9/14 |
| | | 219/69.15 |
| 2007/0102402 A1 | 5/2007 | Miyake et al. |

(Continued)

FOREIGN PATENT DOCUMENTS

| CN | 1890045 A | 1/2007 |
| CN | 101132879 A | 2/2008 |

(Continued)

OTHER PUBLICATIONS

Chinese Office Action dated Oct. 10, 2020, in connection with corresponding CN Application No. 2019-11043656.0 (10 pp., including machine-generated English translation).

(Continued)

*Primary Examiner* — Geoffrey S Evans
(74) *Attorney, Agent, or Firm* — Maier & Maier, PLLC

(57) ABSTRACT

A compact lower guide unit that allows the electrode guide to be attached and detached more easily and reliably. Provided is a lower guide unit including a housing, an electrode guide, and a pull-up mechanism having a guide support, links, and a power cylinder. The guide support includes a biasing member and a displacement member. The biasing member can bias the displacement member, and the displacement member can be displaced between a restriction position and a release position. The links can be rotated by a force applied by the power cylinder. The electrode guide is fixed to the guide support by a biasing force of the biasing member when the displacement member is in the restriction position, and the electrode guide is released from the lower guide unit when the displacement member is displaced to the release position.

8 Claims, 14 Drawing Sheets

(56) References Cited

U.S. PATENT DOCUMENTS

| | | |
|---|---|---|
| 2008/0197115 A1 | 8/2008 | Miyake et al. |
| 2011/0174783 A1 | 7/2011 | Suzuki et al. |
| 2014/0144884 A1 | 5/2014 | Suzuki et al. |
| 2016/0303673 A1 | 10/2016 | Tamura et al. |
| 2018/0065199 A1 | 3/2018 | Kido et al. |
| 2019/0009379 A1 | 1/2019 | Kiuchi et al. |

FOREIGN PATENT DOCUMENTS

| | | | |
|---|---|---|---|
| CN | 101980815 A | 2/2011 | |
| CN | 102112261 A | 6/2011 | |
| CN | 103118826 A | 5/2013 | |
| CN | 105189002 A | 12/2015 | |
| CN | 109216233 A | 1/2019 | |
| CN | 109715333 A | 5/2019 | |
| JP | H08294823 A | 11/1996 | |
| JP | 3999537 B2 | 10/2007 | |
| JP | 4152602 B2 | 9/2008 | |
| WO | 00/64617 A1 | 11/2000 | |
| WO | WO-2005070600 A1 * | 8/2005 | ............... B23H 1/10 |

OTHER PUBLICATIONS

United Kingdom Search Report dated Mar. 3, 2021, in connection with corresponding GB Application No. 2014513.2; 1 page.

* cited by examiner

LOWER GUIDE UNIT OF ELECTRICAL DISCHARGE MACHINE

TECHNICAL FIELD

The present invention relates to a lower guide unit accommodating a lower guide for guiding a vertically lower portion of a tool electrode in an electrical discharge machine configured to generate electrical discharge between the tool electrode and a workpiece and to perform electrical discharge machining on the workpiece by electrical discharge energy.

BACKGROUND ART

A so-called fine hole electrode that is rod and pipe-shaped with a length of several hundreds of millimeters or more and a diameter (outer diameter) of several millimeters or less has low rigidity and is easily bent. Therefore, when the distance from a machining head to a tip of the fine hole electrode is long, the deflection may occur during machining and makes it difficult to make a straight hole. For this reason, in a fine hole electrical discharge machine, a lower guide unit accommodating an electrode guide is provided near an upper surface of the workpiece to support a tip side of the fine hole electrode, and one or more intermediate guides are provided between the machining head and the lower guide unit according to the distance from the machining head to the lower guide unit. The diameter of the fine hole electrode to be used changes according to the diameter of a desired hole to be machined. When a fine hole electrode is replaced with one having a different outer diameter in a fine hole electrical discharge machine provided with the electrode guide on the tip side of the fine hole electrode, the electrode guide is also replaced. The replacement of the fine hole electrode and the electrode guide is a labor-intensive operation, and thus it is desirable to automate the replacement in order to improve production efficiency.

Patent Literature 1 discloses a fine hole electrical discharge machine having a function of automatically performing a positioning operation of an electrode for fine hole machining by contact detection in order to automatically replace an electrode guide. In this fine hole electrical discharge machine, the electrode guide is automatically attached to and detached from an insertion hole formed in a guide mounting base from an upper side. Further, Patent Literature 2 discloses an electrical discharge machine comprising an automatic replacement device configured to replace a tool electrode together with an electrode holder. Patent Literature 2 discloses attachment and detachment mechanism for an electrode holder of a well-known pull-stud type. In this attachment and detachment mechanism, the electrode holder is automatically attached to and detached from an electrode holder chuck from a lower side, and the electrode holder is attached and fixed by engaging a groove formed in the electrode holder with a steel ball.

CITATION LIST

Patent Literature

[Patent Literature 1] JP-B-3999537
[Patent Literature 2] JP-B-4152602

SUMMARY OF INVENTION

Technical Problem

Since the lower guide unit is arranged near the upper surface of the workpiece, it is configured to be compact so as not to interfere with processing. Further, in order to use the fine hole electrode as much as possible, the height of the lower guide unit, in other words, the thickness thereof is made as small as possible. Therefore, when the lower guide unit is provided with a mechanism for automatically replacing the electrode guide, it is required that the electrode guide can be attached and detached more easily and reliably, and that the lower guide unit does not become too large. In this regard, in the fine hole electrical discharge machining, it is necessary to increase the accuracy of electrode guide replacement in order to perform processing with high accuracy of a processing error of about 10 μm or less. Specifically, the electrode guide should be positioned with respect to a housing of the lower guide unit with high accuracy.

In addition, an electrode holder for holding the fine hole electrode and attaching it to a machining head, a spindle for rotating a fine hole electrode during electrical discharge machining, and a component, such as an intermediate guide, are provided above the lower guide unit. Therefore, when the attachment and detachment mechanism is provided above the electrode guide in order to automate the replacement of the electrode guide, the design of the lower guide unit is considerably restricted by the arrangement of other components. On the other hand, when the attachment and detachment mechanism is arranged below the electrode guide, the attachment and detachment mechanism may interfere with the workpiece. Further, the electrode guide needs to be firmly attached and fixed so as not to be detached from the lower guide unit, for example, even when receiving a high-pressure jet of working fluid supplied to a flow channel inside the electrode guide. Consequently, the size of the entire electrical discharge machining unit including the lower guide unit tends to be large.

The present invention has been made in view of such circumstances, and the main purpose is to provide a compact lower guide unit that allows the electrode guide to be attached and detached more easily and reliably.

Solution to Problem

According to the present invention, provided is a lower guide unit configured to guide a vertically lower portion of a tool electrode in an electrical discharge machine for electrical discharge machining, comprising: a housing comprising a fitting hole having a tapered surface, an electrode guide comprising a tapered portion tapering upward, and a pull-up mechanism comprising a guide support, a plurality of links, and a power cylinder, wherein the guide support comprises at least one biasing member and a displacement member; the biasing member is arranged to bias the displacement member in a vertical direction; the displacement member is configured to be displaced in the vertical direction between a restriction position and a release position; the links are arranged to interpose the guide support therebetween and are configured to be rotated by a force applied by the power cylinder; the electrode guide is configured to be fixed to the guide support by a biasing force of the biasing member in a state where the tapered portion is fitted into the fitting hole when the displacement member is in the restriction position; and the electrode guide is further configured to be released from the lower guide unit when the displacement member is displaced, along with rotation of the links, to the release position against the biasing force of the biasing member.

Advantageous Effects of Invention

In the lower guide unit according to the present invention, when the electrode guide is attached, the electrode guide is biased vertically upward by the biasing member in a state where the tapered portion of the electrode guide is fitted into the fitting hole of the housing. The position of the electrode guide with respect to the housing along a direction of a central axis of the electrode guide is uniquely determined by the fitting, and thus positioning is easy, and the electrode guide can be reliably fixed by the biasing force of the biasing member. Further, the fixing is released by rotating the links by the power cylinder, so that the electrode guide can be easily pulled out. Since the force applied by the power cylinder can be converted into a vertical force by the links to displace the displacement member, it is not necessary to arrange a power mechanism above the electrode guide, and thus the lower guide unit can be configured to be more compact.

Hereinafter, various embodiments of the present invention will be exemplified. The embodiments described below can be combined with each other.

Preferably, the guide support further comprises an outer frame arranged to sandwich the displacement member from sides where the links are arranged; the outer frame comprises two slot-shaped through holes extending in a horizontal direction; the displacement member comprises two projections each projecting to a side where the outer frame is arranged; and the two projections are each inserted into the two slot-shaped through holes and are configured to be movable in the slot-shaped through hole along with displacement of the displacement member.

Preferably, the electrode guide further comprises a pull-stud portion provided at an upper end; the guide support comprises a plurality of balls; the balls are configured to be movable, along with displacement of the displacement member, between an engagement position and a disengagement position in a ball receiving space formed inside the guide support; the balls are configured to move to the engagement position to engage with the pull-stud portion when the displacement member is displaced to the restriction position; and the balls are further configured to disengage from the pull-stud portion to move to the disengagement position when the displacement member is displaced to the release position.

Preferably, the plurality of links comprises two pairs of parallel links.

Preferably, at least a part of the biasing member is accommodated in a hole formed on an upper surface of the housing.

Preferably, the at least one biasing member comprises four compression springs arranged in parallel.

Preferably, the power cylinder is a double-acting cylinder configured to rotate the links by applying a horizontal force to the guide support.

Preferably, the housing and the electrode comprise therein at least one flow channel for supplying working fluid or compressed gas.

DESCRIPTION OF EMBODIMENTS

Hereinafter, embodiments of the present invention will be described with reference to the drawings. Various characteristics described in the embodiments below can be combined with each other. The invention is independently established for each characteristic. In this regard, the overall configuration of a fine hole electrical discharge machine including a machining head and an intermediate guide is omitted in the following description and the drawings. The overall configuration is approximately the same as that of the electrical discharge machine according to the well-known embodiments, and prior arts can be referred to for the specific configuration.

1. Configuration of Lower Guide Unit

Figure 1:
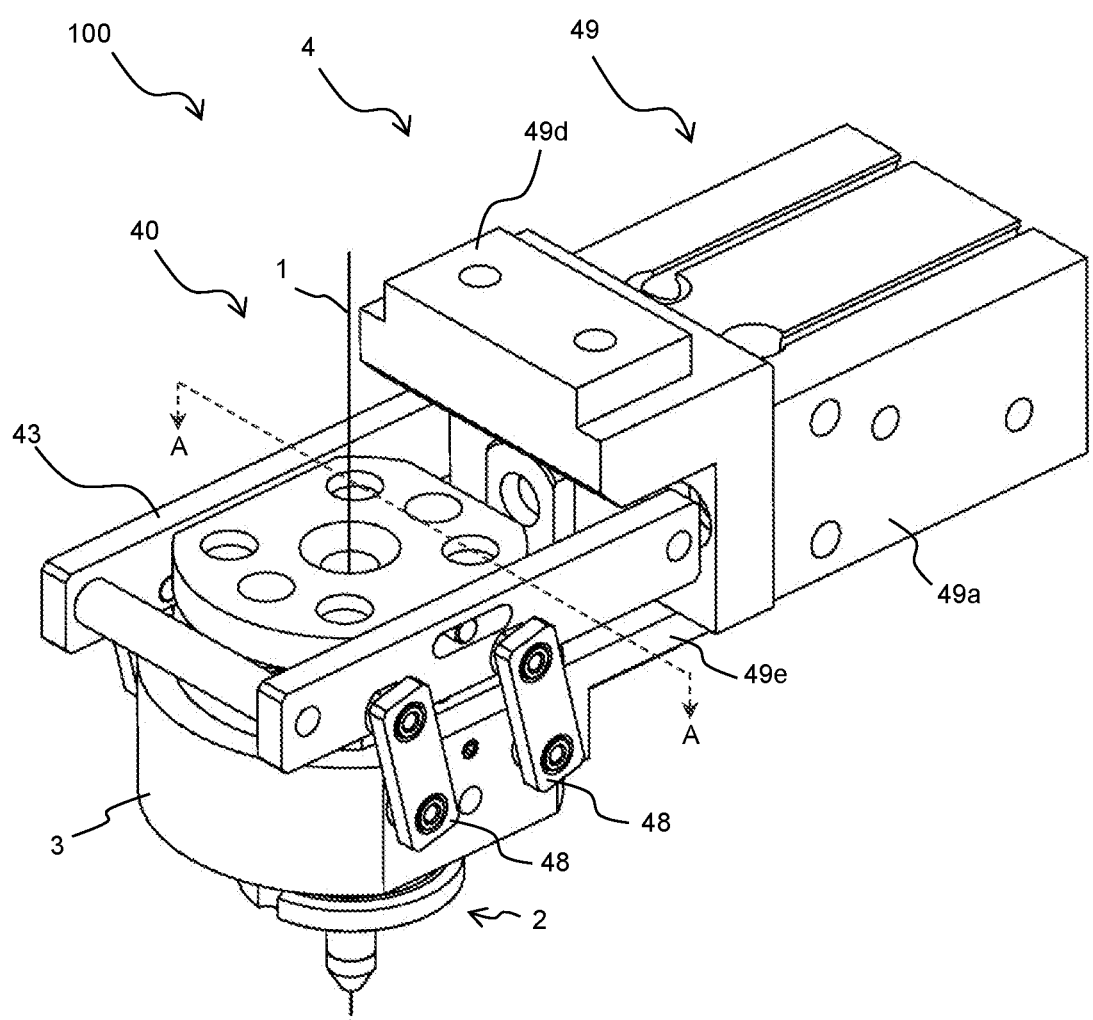
FIG. 1 is a perspective view of a lower guide unit 100 according to an embodiment of the present invention.
Figure 4:
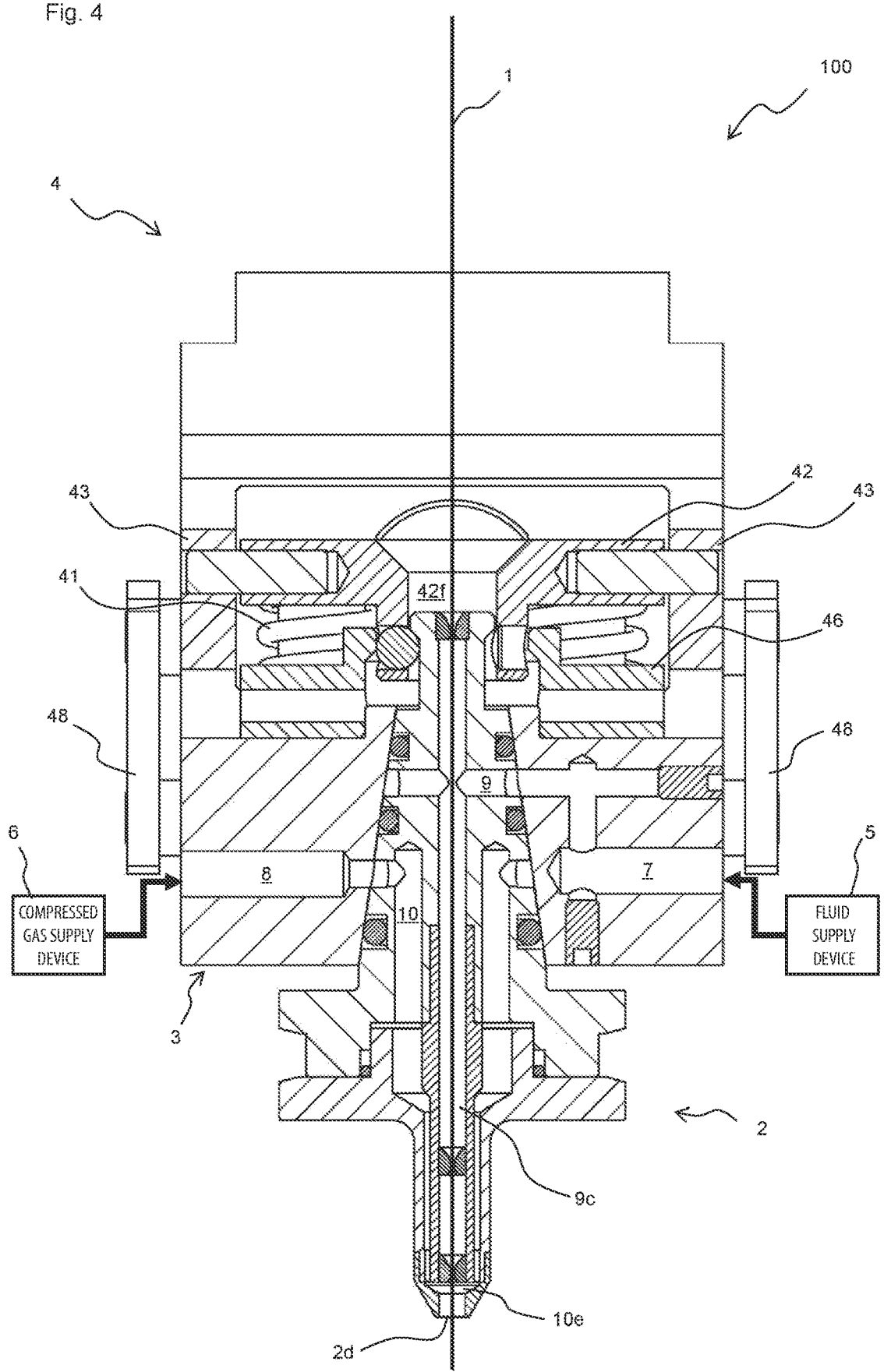
FIG. 4 is a front cross-sectional view of the lower guide unit 100 in a state where the electrode guide 2 is attached and fixed, in a plane passing through a central axis of the electrode guide 2.

A lower guide unit 100 of one embodiment of the present invention is attached to an electrical discharge machine for electrical discharge machining to perform electrical discharge machining on a portion to be machined of a workpiece (not shown). As shown in FIG. 1 and FIG. 4, the lower guide unit 100 is configured to guide a vertically lower portion of a tool electrode 1 and comprises an electrode guide 2, a housing 3, and a pull-up mechanism 4. Flow channels of compressed working fluid supplied from a working fluid supplying device 5 and compressed air supplied from a compressed gas supplying device 6 are formed inside the electrode guide 2 and the housing 3. Mist generated through the flow channels is ejected from a lower surface of the electrode guide 2 toward the portion to be machined of the workpiece, so that electrical discharge machining can be performed while removing machining chips generated during machining.

1.1. Tool Electrode

The tool electrode 1 is a cylindrical pipe electrode provided with a hollow hole inside and has an outer diameter of, for example, 0.3 to 3.0 mm. The tool electrode 1 inserted through the electrode guide 2 along a central axis of the electrode guide 2 so that at least a tip can protrude. An intermediate part of the tool electrode 1 is supported by an intermediate guide (not shown) above the lower guide unit 100, and an upper part of the tool electrode 1 is attached to a machining head (not shown) by an electrode holder (not shown). An electrical discharge is generated during machining of the workpiece by applying a voltage between the tool electrode 1 and the workpiece, and the tool electrode 1 can perform machining while being rotated around the central axis of the electrode guide 2 by a spindle (not shown) arranged above the lower guide unit 100. Further, compressed gas is supplied from the compressed gas supplying device 6 into the hollow hole of the tool electrode 1 and is ejected onto the portion to be machined of the workpiece. In this regard, while the tool electrode 1 in the present embodiment is a pipe electrode having a hollow hole with a circular cross section, a pipe electrode having any shape or any number of hollow holes may be used, and a rod-shaped electrode without a hollow hole may be also used.

1.2. Housing

Figure 6:
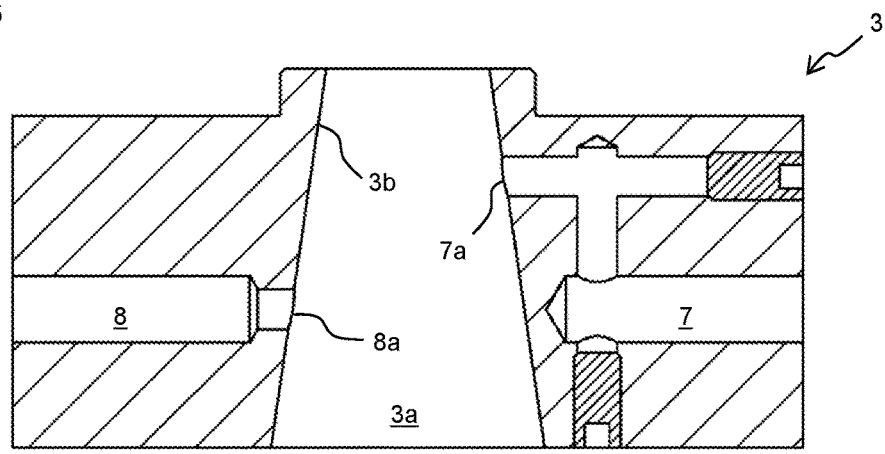
FIG. 6 is an exploded cross-sectional view of a housing 3 and the electrode guide 2 of FIG. 1 seen from a front side.
Figure 6:
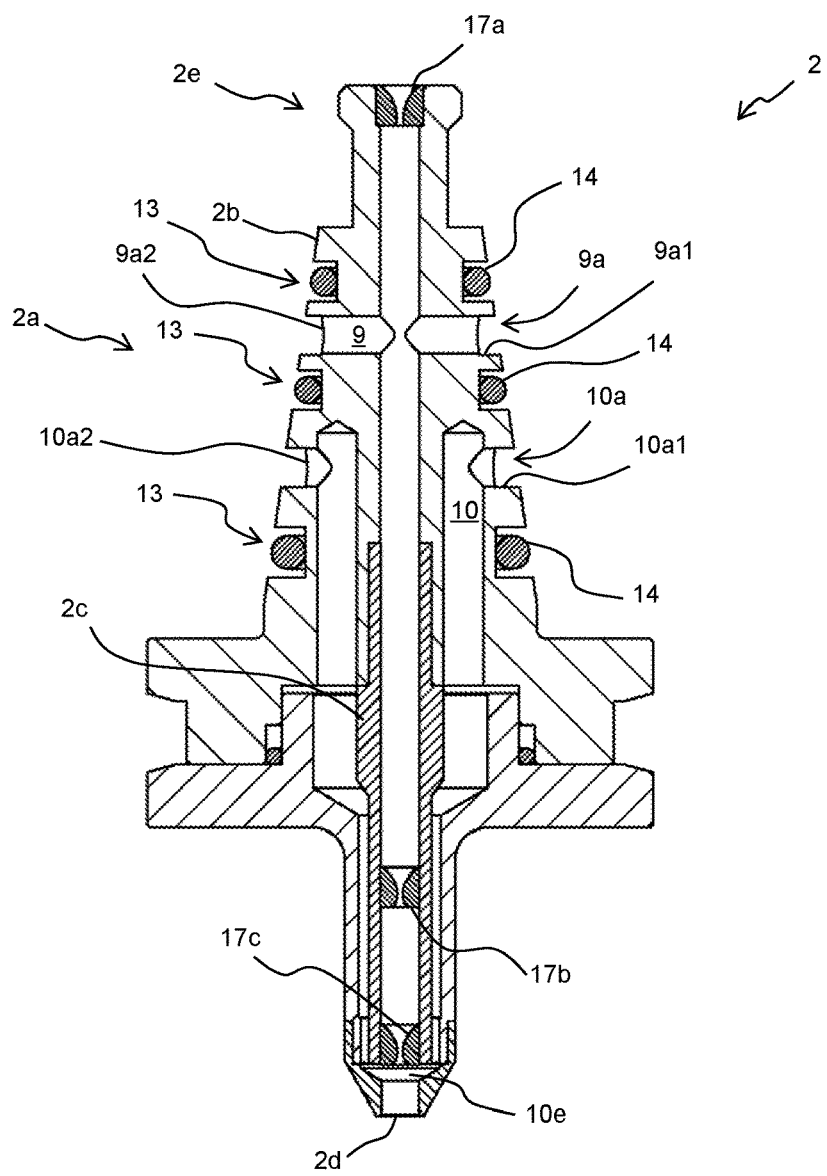

As shown in FIG. 4 and FIG. 6, the housing 3 comprises a fitting hole 3a having a tapered surface 3b and is supported by the pull-up mechanism 4 via a plurality of links 48. The tapered surface 3b of the housing 3 is provided with a first supply path outlet 7a and a second supply path outlet 8a. A first supply path 7 connecting the working fluid supplying device 5 and the first supply path outlet 7a and a second supply path 8 connecting the compressed gas supplying device 6 and the second supply path outlet 8a are formed in the housing 3. The first supply path 7 is a flow channel for supplying the compressed working fluid from the working fluid supplying device 5 to the electrode guide 2, and the second supply path 8 is a flow channel for supplying the compressed gas from the compressed gas supplying device 6 to the electrode guide 2.

1.3. Working Fluid Supplying Device

The working fluid supplying device 5 is configured to supply the compressed working fluid. The working fluid supplying device 5 includes, for example, a tank that stores the working fluid, a pump that pumps the working fluid from the tank, and a pipe that connects each part. As the working fluid, water, a water-soluble working fluid, an oil-based working fluid or the like may be used. In the present embodiment, water is used as the working fluid.

1.4. Compressed Gas Supplying Device

The compressed gas supplying device 6 is configured to supply the compressed gas. The compressed gas supplying device 6 is, for example, a compressor. As the compressed gas, air, oxygen, nitrogen, argon or the like may be used. In the present embodiment, air is used as the compressed gas.

1.5. Electrode Guide

Figure 2:
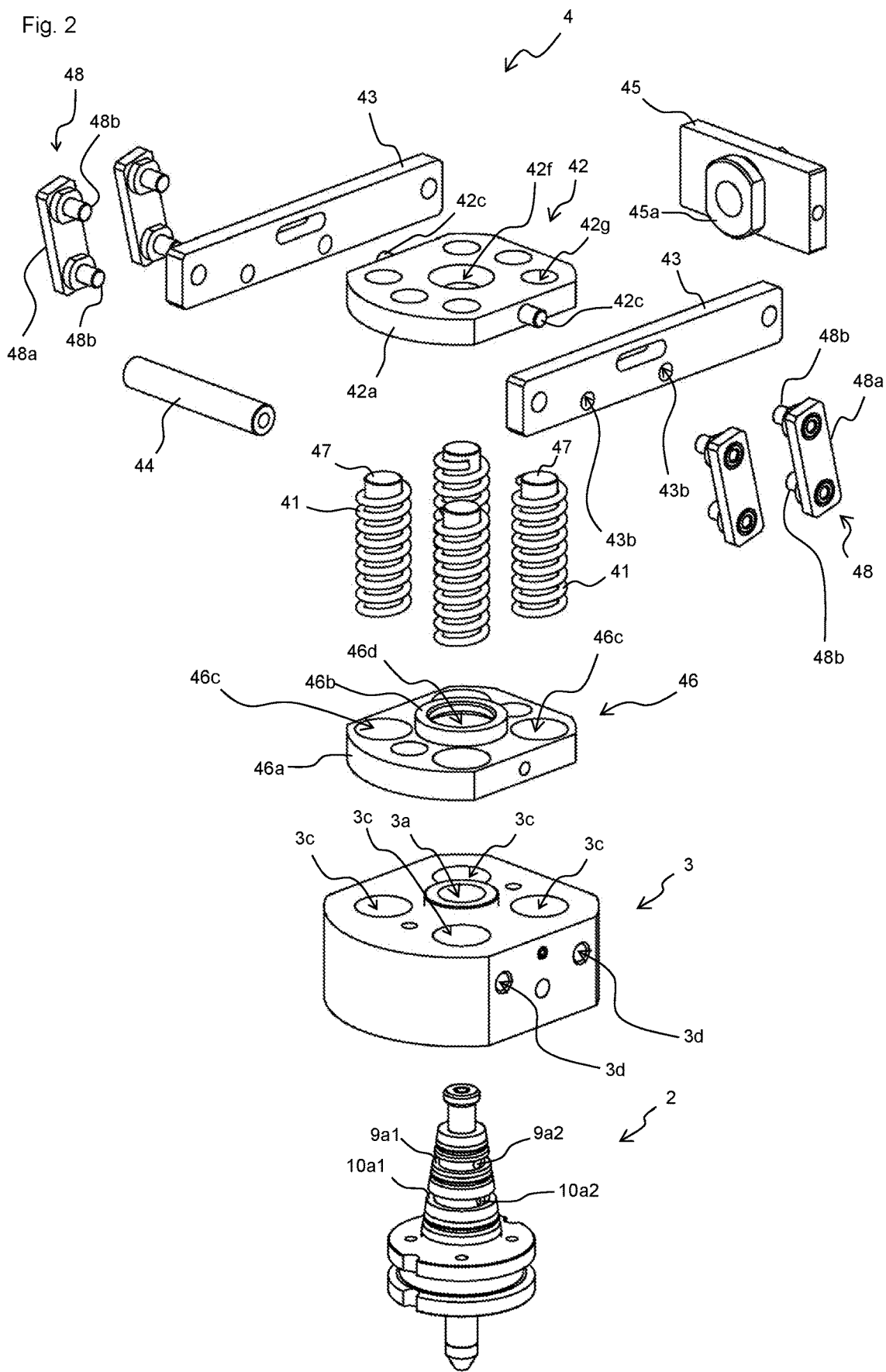
FIG. 2 is an exploded perspective view of components other than a tool electrode 1 and a power cylinder 49 when the lower guide unit 100 of FIG. 1 is seen from an upper front side.

As shown in FIG. 2, FIG. 4, and FIG. 6, the electrode guide 2 comprises a tapered portion 2a tapering upward, a pull-stud portion 2e that is provided above the tapered portion 2a and at an upper end of the electrode guide 2 and has a bulged portion at an upper end, a die fixing portion 2c provided below the tapered portion 2a, in other words, on a downstream side with respect to the flow of the compressed gas, and an ejection opening 2d formed on a lower surface. The electrode guide 2 is detachably attached to the pull-up mechanism 4. The tapered surface 2b of the tapered portion 2a is provided with a first connection port 9a and a second connection port 10a each having an annular concave portion extending along a circumferential direction of the tapered portion 2a so that the second connection port 10a can be located closer to the lower surface of the electrode guide 2 than the first connection port 9a.

A first flow path 9 connecting the first connection port 9a and the ejection opening 2d is formed in the electrode guide 2. The first flow path 9 is connected to the first supply path 7 by fitting the tapered portion 2a into the fitting hole 3a of the housing 3 and serves as a flow channel of the compressed working fluid supplied from the working fluid supplying device 5. The first flow path 9 comprises a working fluid filling region 9c formed between the tool electrode 1 inserted along the central axis of the electrode guide 2 and an inner surface of the electrode guide 2. By filling the working fluid filling region 9c with the supplied working fluid and circulating the working fluid, the tool electrode 1 can be efficiently cooled, and the consumption of the tool electrode 1 during electrical discharge machining can be suppressed.

The first connection port 9a comprises a first annular concave portion 9a1 and a plurality of first openings 9a2 formed on a bottom surface of the first annular concave portion 9a1 so as to be separated from each other in a circumferential direction of the first annular concave portion 9a1, and the first connection port 9a is connected to the first flow path 9 via the plurality of first openings 9a2. In the present embodiment, two first openings 9a2 are formed at positions facing each other in the circumferential direction of the first annular concave portion 9a1. When the working fluid supplying device 5 supplies the compressed working fluid to the first supply path 7 and the first flow path 9, the working fluid is transferred to the first flow path 9 via the two first openings 9a2. Consequently, the working fluid can flow stably and uniformly in the working fluid filling region 9c.

As shown in FIG. 2, FIG. 4, and FIG. 6, a second flow path 10 for connecting the second connection port 10a and the ejection opening 2d is further formed in the electrode guide 2. The second flow path 10 is connected to the second supply path 8 by fitting the tapered portion 2a into the fitting hole 3a of the housing 3 and serves as a flow channel of the compressed gas supplied from the compressed gas supplying device 6. The second flow path 10 comprises a mist generation space 10e provided on the downstream side with respect to the flow of the compressed gas.

The second connection port 10a comprises a second annular concave portion 10a1 and a plurality of second openings 10a2 formed on a bottom surface of the second annular concave portion 10a1 so as to be separated from each other in a circumferential direction of the second annular concave portion 10a1, and the second connection port 10a is connected to the second flow path 10 via the plurality of second openings 10a2. In the present embodiment, two second openings 10a2 are formed at positions facing each other in the circumferential direction of the second annular concave portion 10a1. When the compressed gas supplying device 6 supplies the compressed air to the second supply path 8 and the second flow path 10, the compressed air flows into the second flow path 10 via the two second openings 10a2.

As shown in FIG. 4 and FIG. 6, a plurality of dies guiding the tool electrode 1 and disposed so as to be separated from each other is arranged in the working fluid filling region 9c, and a gap (clearance) is provided between the tool electrode 1 and each of the dies. In the present embodiment, three dies 17a, 17b, 17c are arranged, and the gap is provided between each of the dies and the electrode 1.

The deflection of the tool electrode 1 during electrical discharge machining and the associated deviation of a machining position can be prevented by installing the dies 17a, 17b, 17c, and thus it is possible to perform machining with high accuracy. Further, by allowing the compressed working fluid to flow through the gaps between the tool electrode 1 and the dies 17a, 17b, 17c, a very small amount of working fluid can be ejected at an outflow point from the die. Consequently, the working fluid in the working fluid filling region 9c can be ejected at an upper end of the working fluid filling region 9c, thereby cooling the electrode 1 protruding above the working fluid filling region 9c. Further, the working fluid in the working fluid filling region 9c can be supplementarily ejected to the mist generation space 10e at a lower end of the working fluid filling region 9c. In this regard, the gap is preferably 0.0025 to 0.010 mm.

Figure 14:
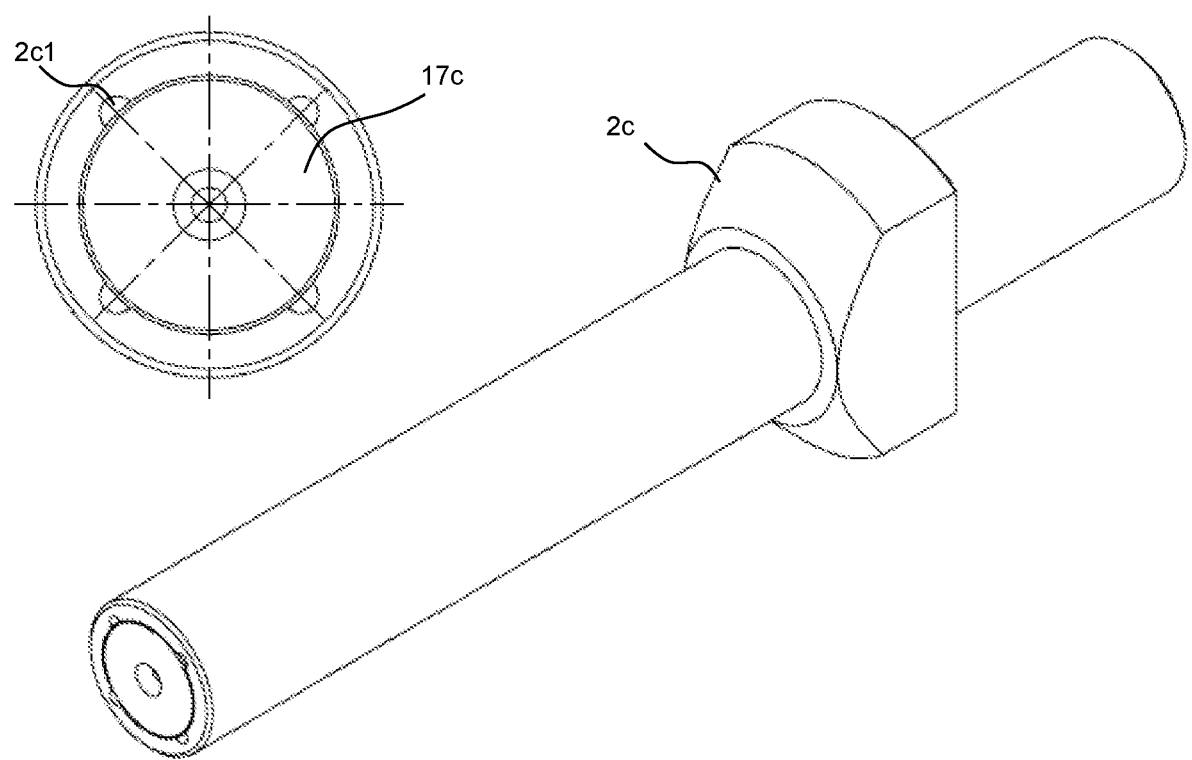
FIG. 14 is an enlarged view of a component of a die fixing portion 2c in FIG. 6 alone.

As shown in FIG. 4 and FIG. 6, the die fixing portion 2c of the electrode guide 2 is configured to fix the dies 17b, 17c by an inner surface thereof. As shown in FIG. 14, a plurality of working fluid ejection grooves 2c1 is formed on the inner surface of the die fixing portion 2c so as to be separated from each other in a circumferential direction of the inner surface, and the compressed working fluid in the working fluid filling region 9c is uniformly supplied to the mist generation space 10e via the working fluid ejection grooves 2c1. In the present embodiment, four working fluid ejection grooves having a substantially semicircular cross section with the same diameter are formed at 90-degree intervals in the circumferential direction of the inner surface of the die fixing portion 2c to extend in a direction of the central axis of the electrode guide 2.

As shown in FIG. 6, annular grooves 13 extending along the circumferential direction of the tapered portion 2a are formed on the tapered surface 2b of the tapered portion 2a at three positions above the first connection port 9a, between the first connection port 9a and the second connection port 10a, and below the second connection port 10a, and an O-ring 14 is fitted into each of the annular grooves 13. The O-ring 14 seals both sides of each of the first connection port 9a and the second connection port 10a along the tapered surface 2b of the tapered portion 2a while the electrode guide 2 is fixed to the pull-up mechanism 4. Consequently, the working fluid and the compressed gas leaking from the connection ports can be prevented from further leaking to the outside of the electrode guide 2.

1.6. Pull-Up Mechanism

As shown in FIG. 1, the pull-up mechanism 4 comprises a guide support 40, the plurality of links 48, and a power cylinder 49 and is configured to detachably hold the electrode guide 2.

<Guide Support 40>

Figure 3:
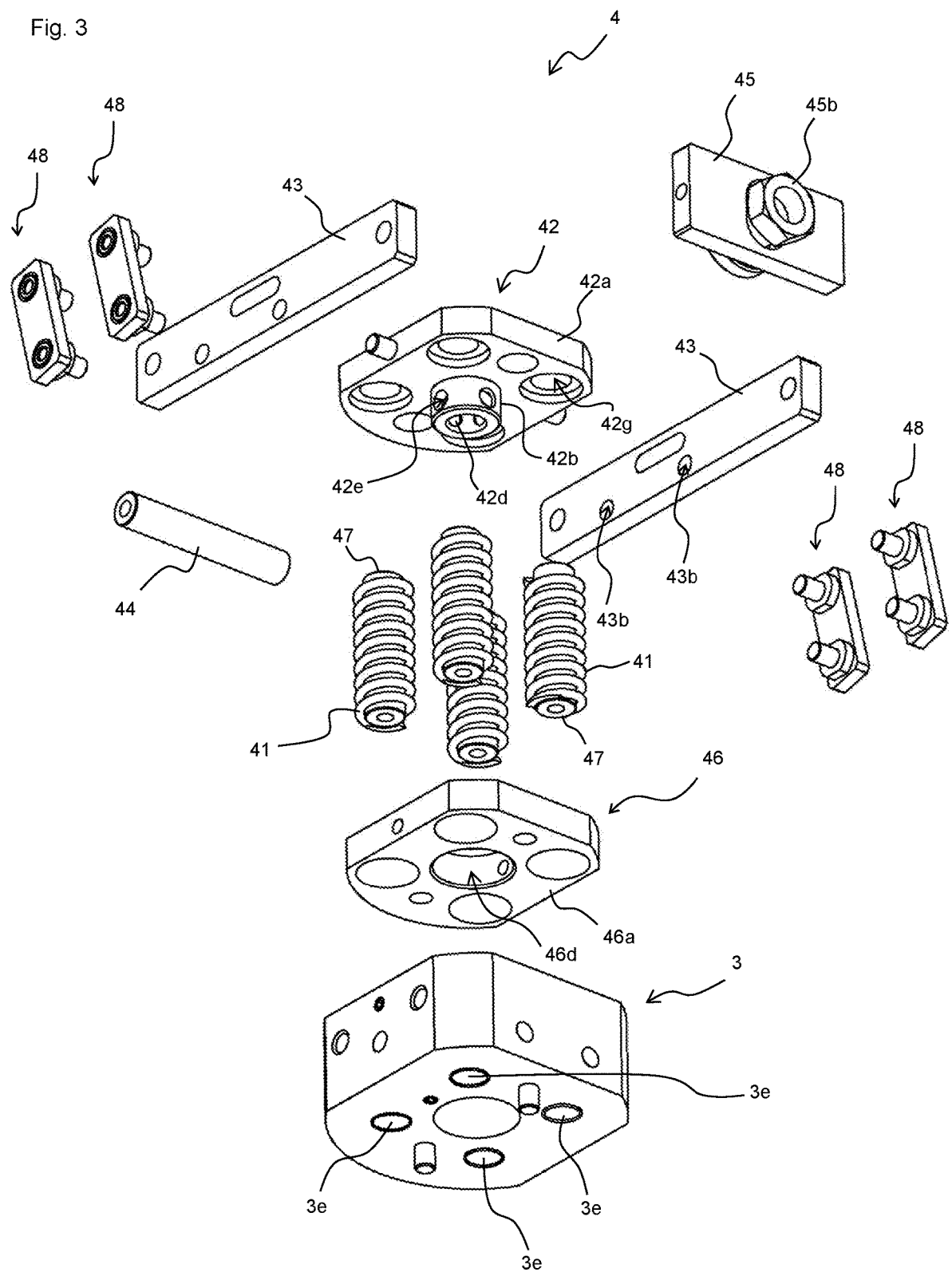
FIG. 3 is an exploded perspective view of components other than the tool electrode 1, an electrode guide 2, and the power cylinder 49 when the lower guide unit 100 of FIG. 1 is seen from a lower back side.
Figure 7:
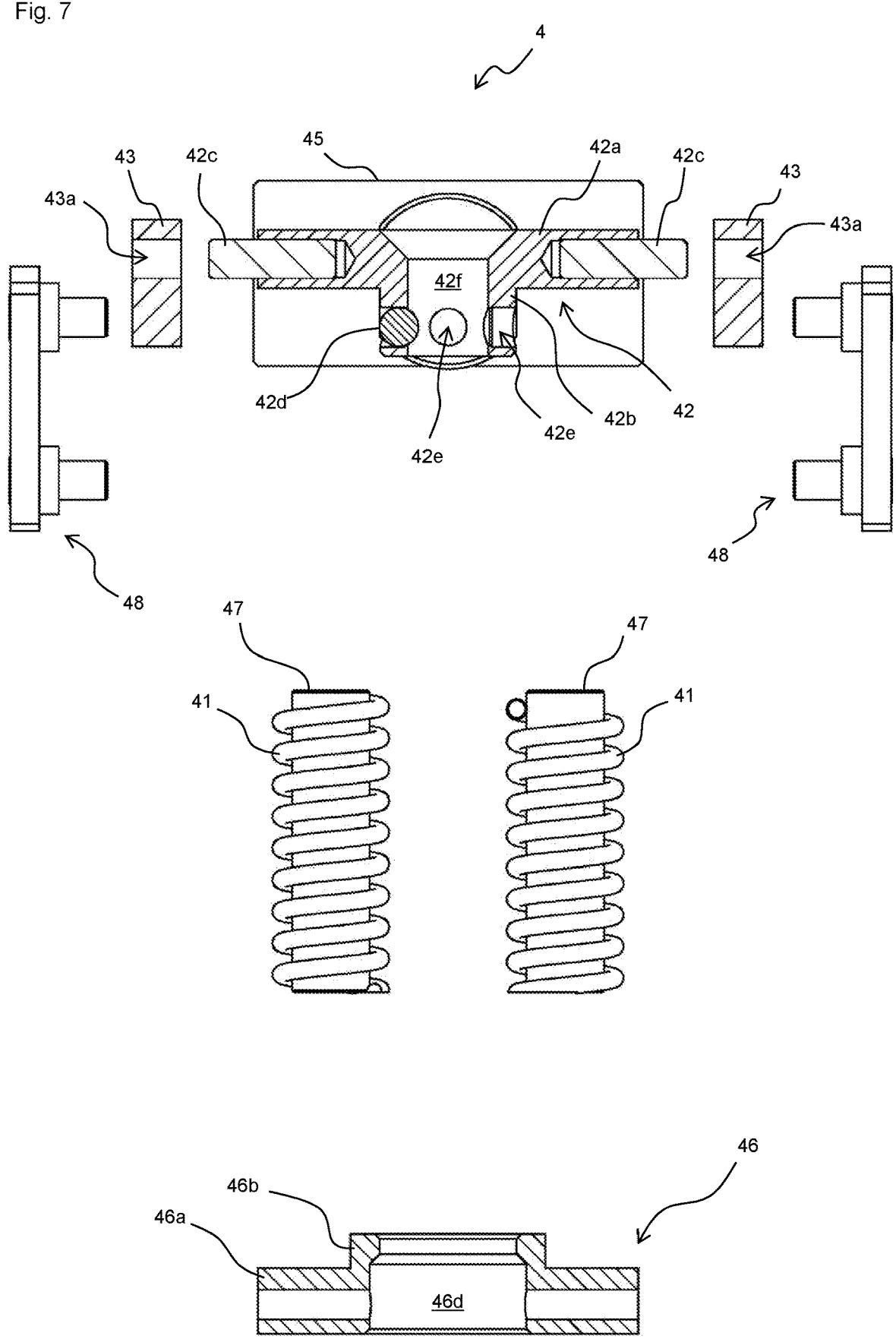
FIG. 7 is an exploded cross-sectional view of a pull-up mechanism 4 of FIG. 1 seen from a front side.

As shown in FIG. 2, FIG. 3, and FIG. 7, the guide support 40 comprises at least one biasing member 41, a displacement member 42, an outer frame 43, a front frame 44, a rear frame 45, a positioning member 46, and a guide shaft 47.

The displacement member 42 in the present embodiment comprises a flat plate portion 42a having a flat plate shape and arranged along a horizontal plane and a cylindrical portion 42b having a cylindrical shape and located below the flat plate portion 42a, and a pull-stud receiving hole 42f is formed in a substantially central part. Two projections 42c are provided on a pair of opposing side surfaces of the flat plate portion 42a.

The positioning member 46 having a substantially flat plate shape is arranged below the displacement member 42. The positioning member 46 comprises a flat plate portion 46a having a flat plate shape and arranged along a horizontal plane and a cylindrical portion 46b having a cylindrical shape and located above the flat plate portion 46a. As shown in FIG. 4 and FIG. 7, an outer surface of the cylindrical portion 42b of the displacement member 42 is guided by the guide shaft 47 to be coaxial with an inner surface of the cylindrical portion 46b of the positioning member 46. Consequently, the displacement member 42 can be displaced in a vertical direction with respect to the positioning member 46.

As shown in FIG. 1, FIG. 4, and FIG. 7, the outer frame 43 in the present embodiment is configured as a pair of members arranged so as to sandwich the displacement member 42, and front sides of the pair of members are connected by the front frame 44. Two slot-shaped through holes 43a extending in a horizontal direction are formed on a side surface of the pair of members. The two projections 42c of the displacement member 42 are configured to be each inserted into the two slot-shaped through holes 43a, so that the slot-shaped through holes 43a can move relative to the projections 42c along a longitudinal direction of a slot.

As shown in FIG. 3 and FIG. 7, a plurality of ball holes 42e is formed on a cylindrical wall of the cylindrical portion 42b of the displacement member 42 along a circumferential direction, and stainless balls 42d are fitted into all or some of the ball holes 42e. As will be described later, the balls 42d are configured to be movable in a ball receiving space 46d inside the cylindrical portion 46b of the positioning member 46 along with the vertical displacement of the displacement member 42 and to engage with the pull-stud portion 2e of the electrode guide 2 to fix the electrode guide 2 to the pull-up mechanism 4. In the present embodiment, four balls 42d are each fitted into four ball holes 42e formed at equal intervals along the circumferential direction the cylindrical portion 42b of the displacement member 42. In this regard, the number and positions of the plurality of ball holes 42e are not limited to the configuration of the present embodiment and can be increased or decreased, though the ball holes 42e are preferably formed at equal intervals along the circumferential direction of the cylindrical portion 42b of the displacement member 42. Further, the number of the balls 42d used is not limited to the example of the present embodiment, though a plurality of balls 42d (preferably three or four balls) is practically needed.

Figure 5:
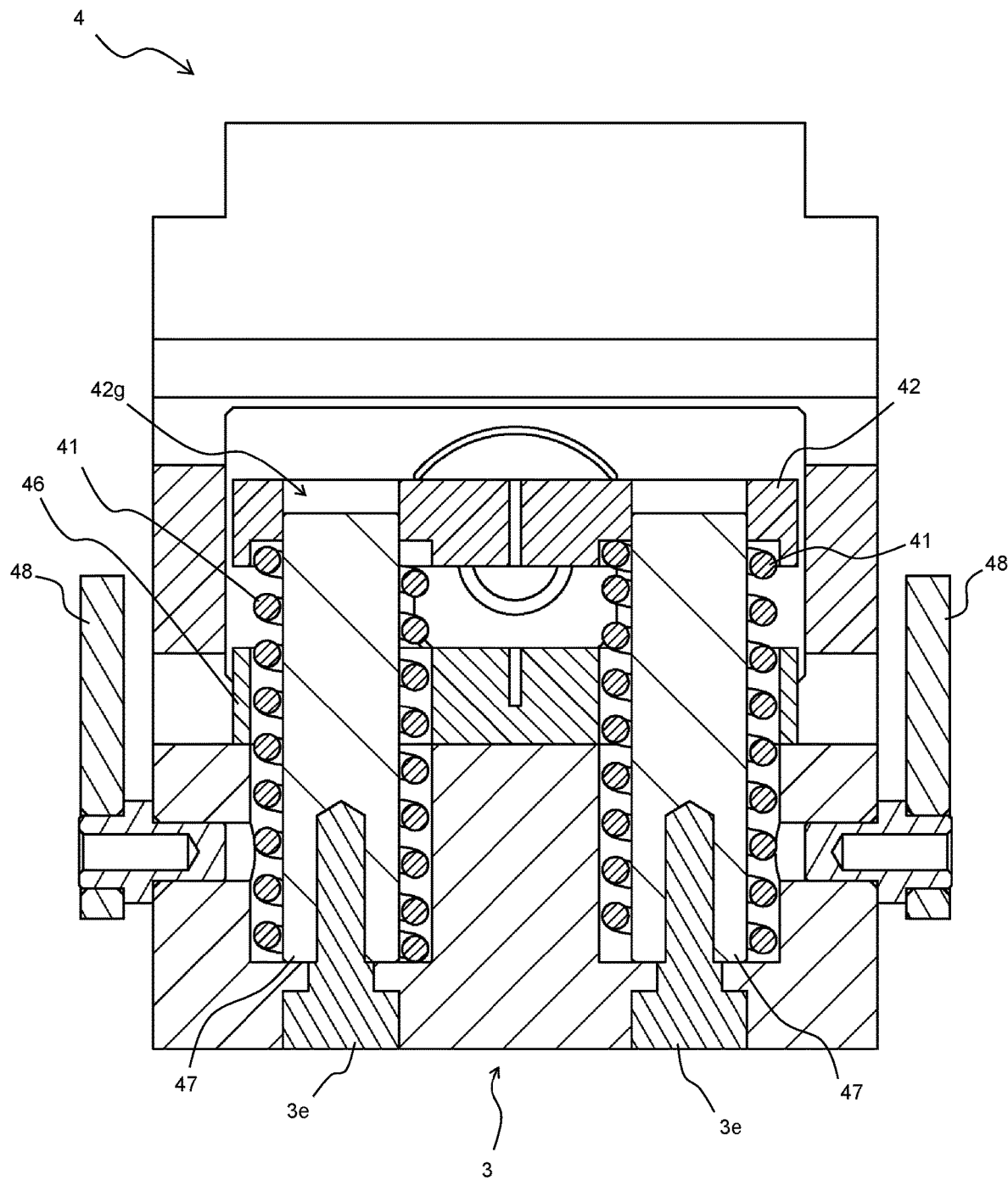
FIG. 5 is a cross-sectional view taken along a line A-A in FIG. 1.

As shown in FIG. 2, FIG. 3, and FIG. 5, the guide support 40 according to the present embodiment comprises four compression springs as the biasing member 41. Upper ends of four guide shafts 47 are fitted into through holes 42g formed at four corners of the flat plate portion 42a of the displacement member 42, and the biasing members 41 wound around the guide shafts 47 are arranged in parallel along the vertical direction. Four through holes 46c are formed at four corners of the positioning member 46, and the biasing members 41 wound around the guide shafts 47 are inserted through the through holes 46c of the positioning member 46. Further, four biasing-member accommodating spaces 3c are formed on an upper surface of the housing 3 and around the fitting hole 3a, and lower ends of the guide shafts 47 are each fixed by four fixing members 3e on bottom surfaces of the biasing-member accommodating spaces 3c. That is, lower sides of the biasing members 41 wound around the guide shafts 47 are each accommodated in the four biasing-member accommodating spaces 3c formed on the upper surface of the housing 3. In the present embodiment, approximately a lower half of the biasing member 41 in a state shown in FIG. 5 is accommodated in the biasing-member accommodating space 3c.

With such a configuration, the biasing member 41 can bias the displacement member 42 in the vertical direction. As will be described later, the biasing member 41 serves to pull up and fix the electrode guide 2 by such a biasing force. Further, at least a part of the biasing member 41 is accommodated in the biasing-member accommodating space 3c, so that an increase in the height (thickness) of the entire lower guide unit due to the arrangement the biasing member 41 can be minimized. In this regard, the number and arrangement of the biasing member 41 is not limited to the example of the present embodiment, though a plurality of biasing members 41 is preferably arranged on a lower surface of the flat plate portion 42a of the displacement member 42 at a position closer to an outer circumference of the flat plate portion 42a and at substantially equal intervals along the outer circumference.

The rear frame 45 is arranged on a back surface of the guide support 40 in a state of being connected to the outer frame 43. A connection member 45a for connecting the guide support 40 and the power cylinder 49 is inserted through a slot-shaped through hole formed in the center of the rear frame 45.

<Power Cylinder 49>

Figure 9:
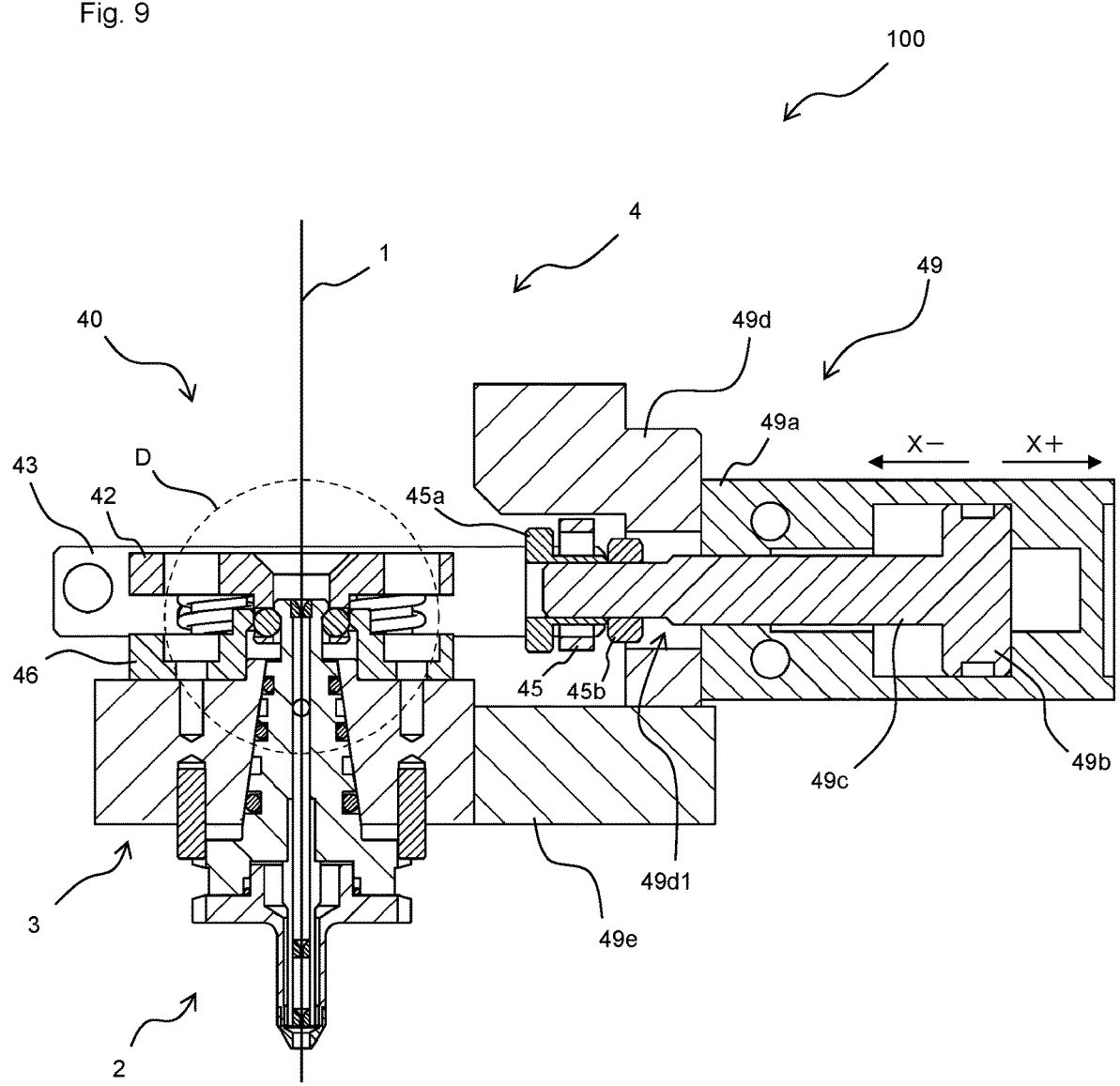
FIG. 9 is a side cross-sectional view of the state of FIG. 8.

As shown in FIG. 1 and FIG. 9 the power cylinder 49 according to the present embodiment is arranged on a back surface side of the guide support 40 and comprises a cylinder 49a, a piston 49b slidable inside the cylinder 49a, a rod 49c, a joint block 49d, and a base 49e. The cylinder 49a is connected to the joint block 49d on a front surface. Further, the rod 49c inserted through a rod guiding hole 49d1 formed on the joint block 49d and connected to the guide support 40 via the connection member 45a and a connection nut 45b. An upper surface of the base 49e is connected to the joint block 49d and is in contact with a back surface of the housing 3 on a front surface.

The power cylinder 49 according to the present embodiment is a double-acting air cylinder, and the rod 49c is configured to reciprocate in the horizontal direction (X+ direction or X− direction in FIG. 8) by air pressure. A tip of the rod 49c is connected to the rear frame 45 via the connection member 45a, and the rear frame 45 and the outer frame 43 connected thereto are moved in the X+ direction or the X− direction along with the reciprocating motion of the rod 49c. In this regard, although the double-acting air cylinder is used as the power cylinder 49 in the present embodiment, the type of the power cylinder 49 is not limited thereto. For example, a single-acting air cylinder or a hydraulic cylinder may be used.

As shown in FIG. 9, the connection member 45a and the connection nut 45b are fixed as a double nut to the rod 49c. When the rod 49c is pulled back to the maximum in the X+ direction as shown in FIG. 9, a space (allowance) of several millimeters is provided between the connection member 45a and an end surface of the rear frame 45 on a side of the connection member 45a. Such an allowance can suppress the propagation of vibration to the guide support 40 especially when the rod 49c is pulled back to the maximum and the piston 49b is stopped.

<Links 48>

Figure 8:
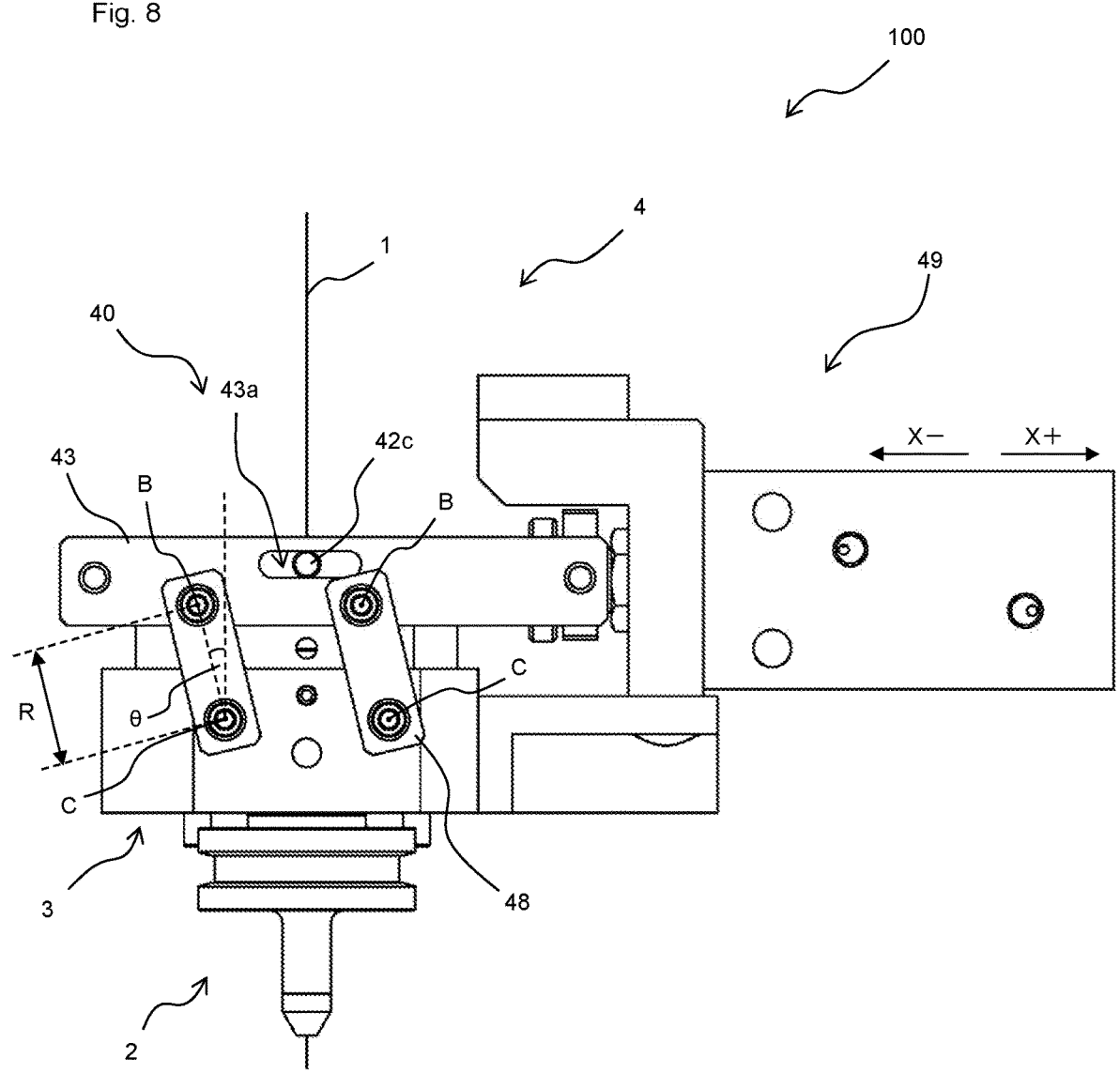
FIG. 8 is a side view of the lower guide unit 100 according to the embodiment of the present invention when the electrode guide 2 is attached and fixed.

The guide support 40 according to the present embodiment comprises two pairs of parallel links as the plurality of links 48. As shown in FIG. 2 and FIG. 7, the link 48 comprises an arm portion 48a and two connection portions 48b, and the arm portion 48a is configured to be rotatable with respect to each of the connection portions 48b. The two pairs of the links 48 are arranged to interpose the guide support 40 therebetween. The two connection portions 48b are fixed in a state of being fitted in a connection hole 43b formed on a side surface of the outer frame 43 and a connection hole 3d formed on a side surface of the housing 3 to connect the pull-up mechanism 4 and the housing 3. In FIG. 8 and FIG. 9, when the rear frame 45 and the outer frame 43 are moved in the X+ direction or the X− direction by a force applied by the power cylinder 49 in the horizontal direction (X+ direction and X− direction in FIG. 8), each of the links 48 is rotated about the connection portion 48b fitted in the connection hole 3d of the housing 3. Specifically, the link 48 is rotated counterclockwise around a supporting point C when the power cylinder 49 applies a force in the X− direction, while the link 48 is rotated clockwise around the supporting point C when the power cylinder 49 applies a force in the X+ direction.

2. Attachment and Detachment of Electrode Guide 2

Next, an attachment and detachment method of the electrode guide 2 to and from the pull-up mechanism 4 is described.

2.1. Fixation of Electrode Guide 2

First, a state where the electrode guide 2 is attached and fixed to the pull-up mechanism 4 is described. As shown in FIG. 4, FIG. 8, and FIG. 9, when the electrode guide 2 is fixed, the tapered portion 2a of the electrode guide 2 is fitted into the fitting hole 3a of the housing 3 so that the tapered surface 2b of the tapered portion 2a can be in close contact with the tapered surface 3b of the housing 3. At least a part of the pull-stud portion 2e is accommodated in the pull-stud receiving hole 42f of the displacement member 42. The position of the displacement member 42 in this state is defined as a restriction position.

The displacement member 42 in the restriction position is biased vertically upward by the biasing members 41. Specifically, a vertically upward biasing force Fs(ΔL) [N] applied to the displacement member 42 in the restriction position can be obtained by the following Equation 1 wherein k [N/mm] represents a spring constant of the four biasing members 41, ΔL [mm] represents the displacement of the biasing members 41, and ΔL=ΔLa [mm] when the displacement member 42 is in the restriction position.

$$Fs(\Delta La) = 4k\,\Delta La \qquad \text{[Equation 1]}$$

Figure 10:
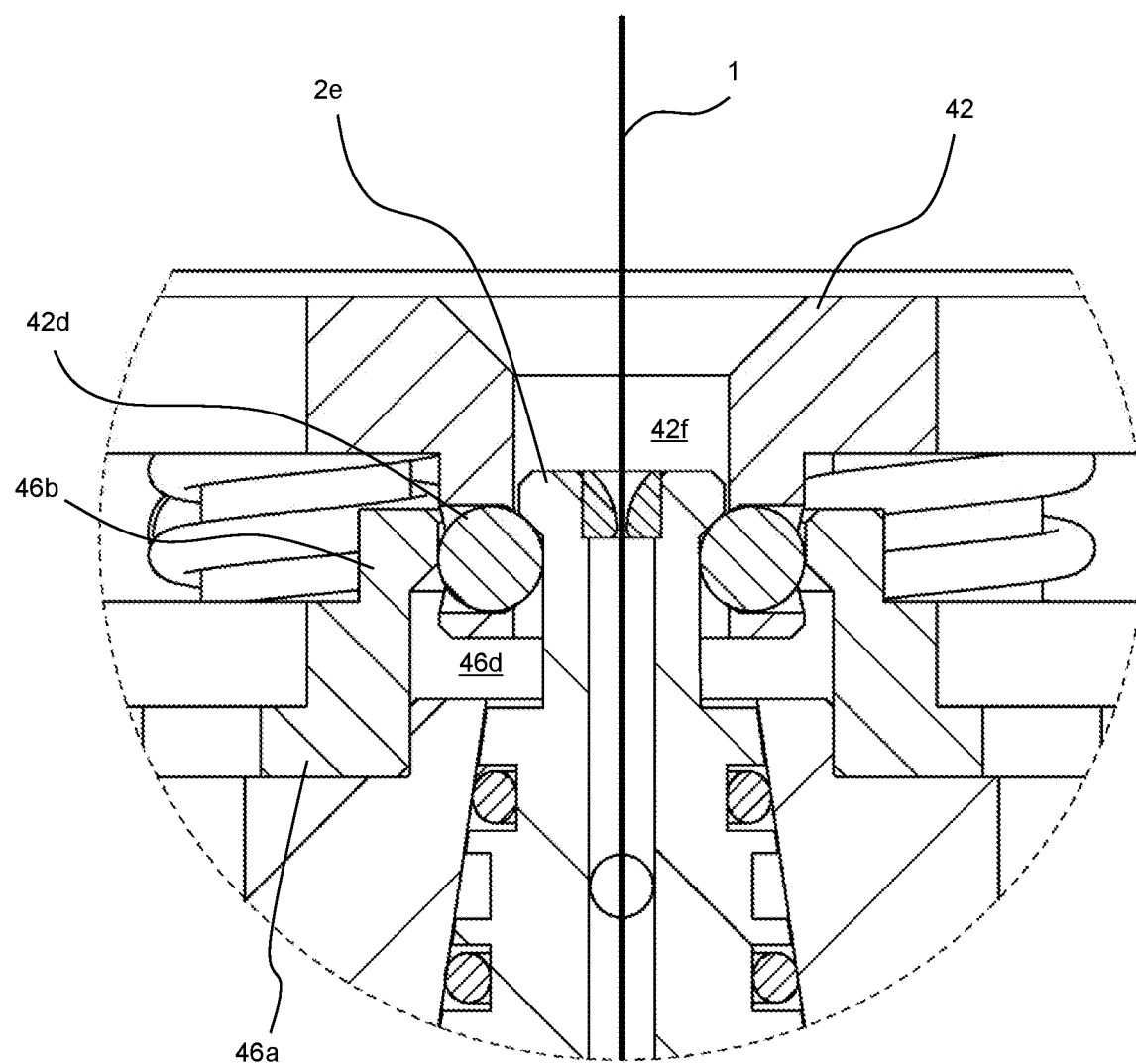
FIG. 10 is an enlarged view of a portion D in FIG. 9.

As shown in FIG. 10, when the displacement member 42 is in the restriction position, the balls 42d are sandwiched between the bulged portion of the pull-stud portion 2e and an inner surface of the cylindrical portion 46b of the positioning member 46. The position of the balls 42d in this state is defined as an engagement position. The electrode guide 2 is firmly fixed without falling off from the pull-up mechanism 4 by the biasing force of the biasing members 41 and the engagement of the balls 42d with the pull-stud portion 2e.

In the present embodiment, the compressed working fluid and the compressed air are supplied into the first flow path 9 and the second flow path 10 in the electrode guide 2, and the generated mist is ejected from the ejection opening 2d during electrical discharge machining. In such a case, a vertically downward force Ff [N] is generated and applied to the electrode guide 2 by the supplied fluid. It is possible to keep the electrode guide 2 fixed while ejecting the mist by appropriately designing the biasing members 41 so that Fs can sufficiently exceed a vertically downward force due to Ff and the load of the electrode guide 2.

2.2. Removal of Electrode Guide 2

Figure 11:
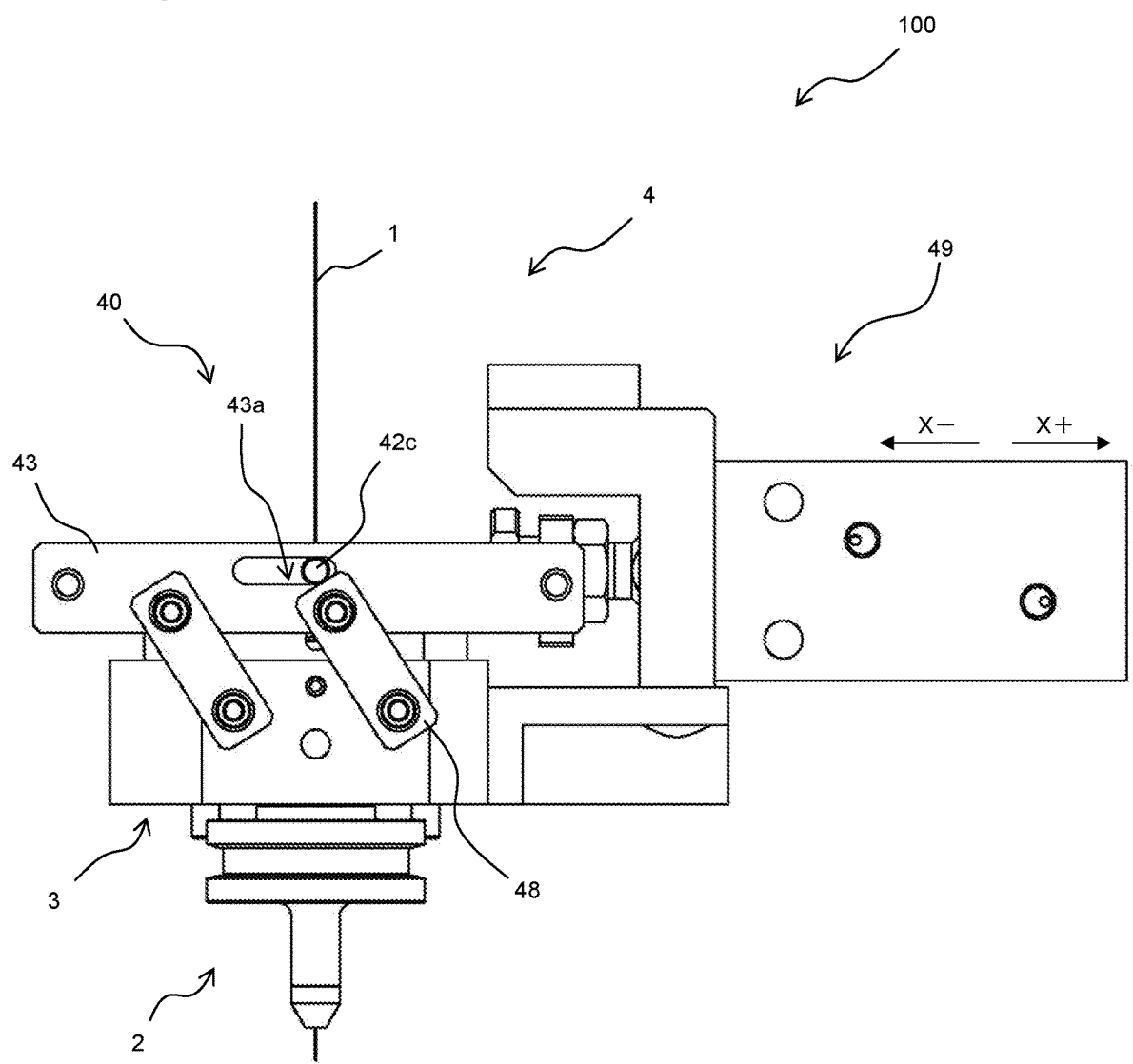
FIG. 11 is a side view of the lower guide unit 100 according to the embodiment of the present invention in a state where the electrode guide 2 can be removed from the lower guide unit 100.
Figure 12:
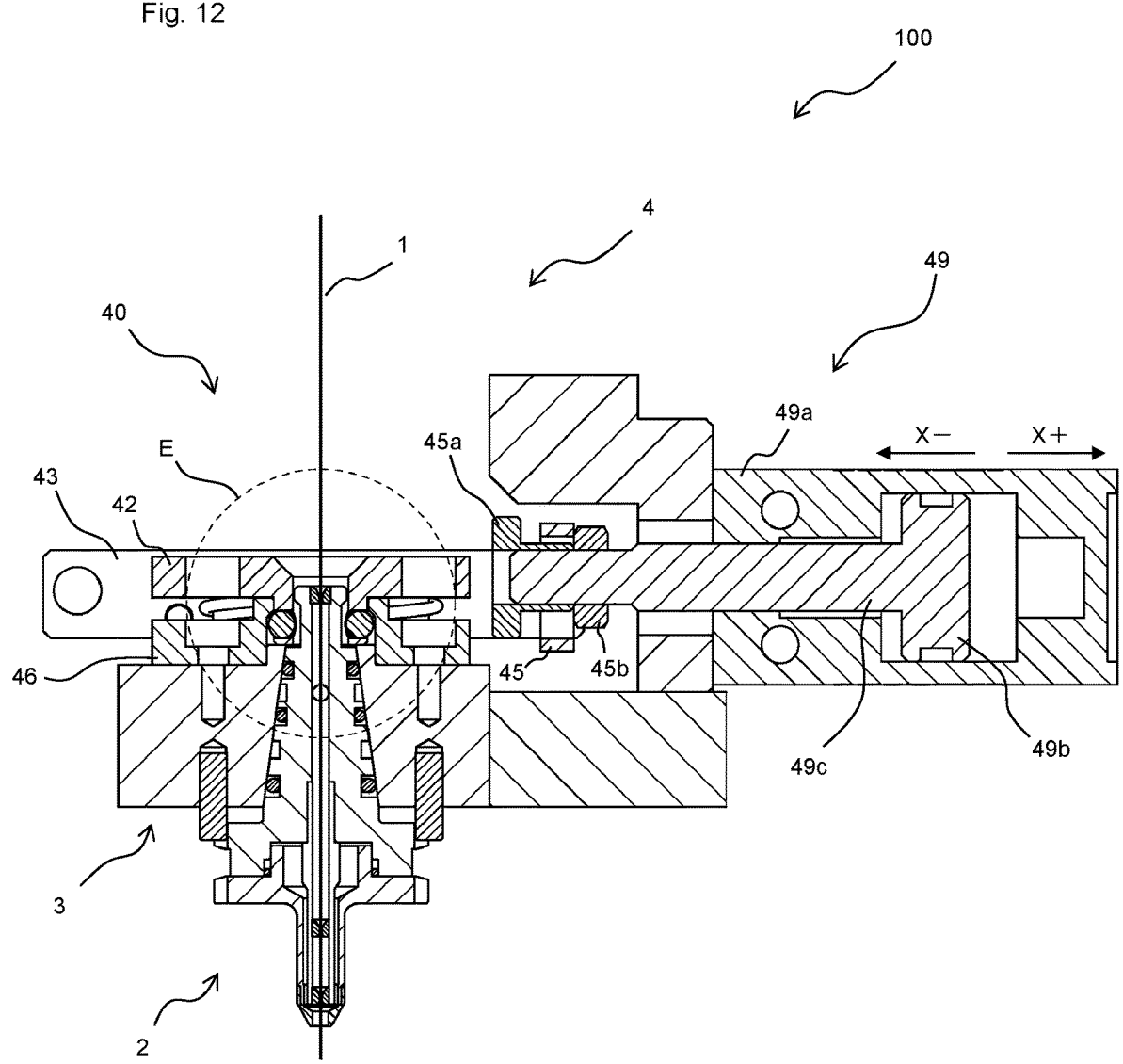
FIG. 12 is a side cross-sectional view of the state of FIG. 11.

Next, a method for detaching the electrode guide 2 from the pull-up mechanism 4 is described. When the electrode guide 2 is detached, a force is applied in the X− direction to the rear frame 45 by the power cylinder 49 in the attached and fixed state of FIG. 8 and FIG. 9. When the rear frame 45 and the outer frame 43 are moved in the X− direction along with the movement of the rod 49c, the links 48 are rotated counterclockwise, resulting in a state where the electrode guide 2 can be removed from the lower guide unit 100, as shown in FIG. 11 and FIG. 12.

The rotation of the links 48 due to the force applied by the power cylinder 49 is described in more detail with reference to FIG. 8. Here, Fh [N] represents a force applied by the power cylinder 49 in the X− direction, θ represents an angle formed between the links 48 and the vertical direction, and R represents the distance between a connection point B where the links 48 and the outer frame 43 are connected and the supporting point C. When the load due to the weight of the electrode guide 2 is sufficiently smaller than Fh and Fs, the balance of the moments of force around the supporting point C is expressed by the following Equation 2.

$$Fs(\Delta L)R \sin \theta - Fh\, R \cos \theta = 0 \quad \text{[Equation 2]}$$

Therefore, the links 48 start to be rotated counterclockwise when the power cylinder 49 applies, in the X− direction, the force Fh [N] that satisfies Equation 3.

$$Fh > Fs(\Delta L) \cdot \tan \theta \quad \text{[Equation 3]}$$

In the process of shifting from the attached and fixed state of FIG. 8 and FIG. 9 to the removable state of FIG. 11 and FIG. 12, the links 48 can be rotated by applying the force Fh always satisfying Equation 3, using the power cylinder 49.

At this time, the displacement member 42 is displaced vertically downward along with the movement of the outer frame 43. As described above, the slot-shaped through holes 43a are configured to be movable relative to the projections 42c along the longitudinal direction of the slot. With such a configuration, the displacement member 42 can be displaced only in the vertical direction in the process of shifting from the attached and fixed state of FIG. 8 and FIG. 9 to the removable state of FIG. 11 and FIG. 12, or in the process of shifting from the removable state to the attached and fixed state described later.

Figure 13:
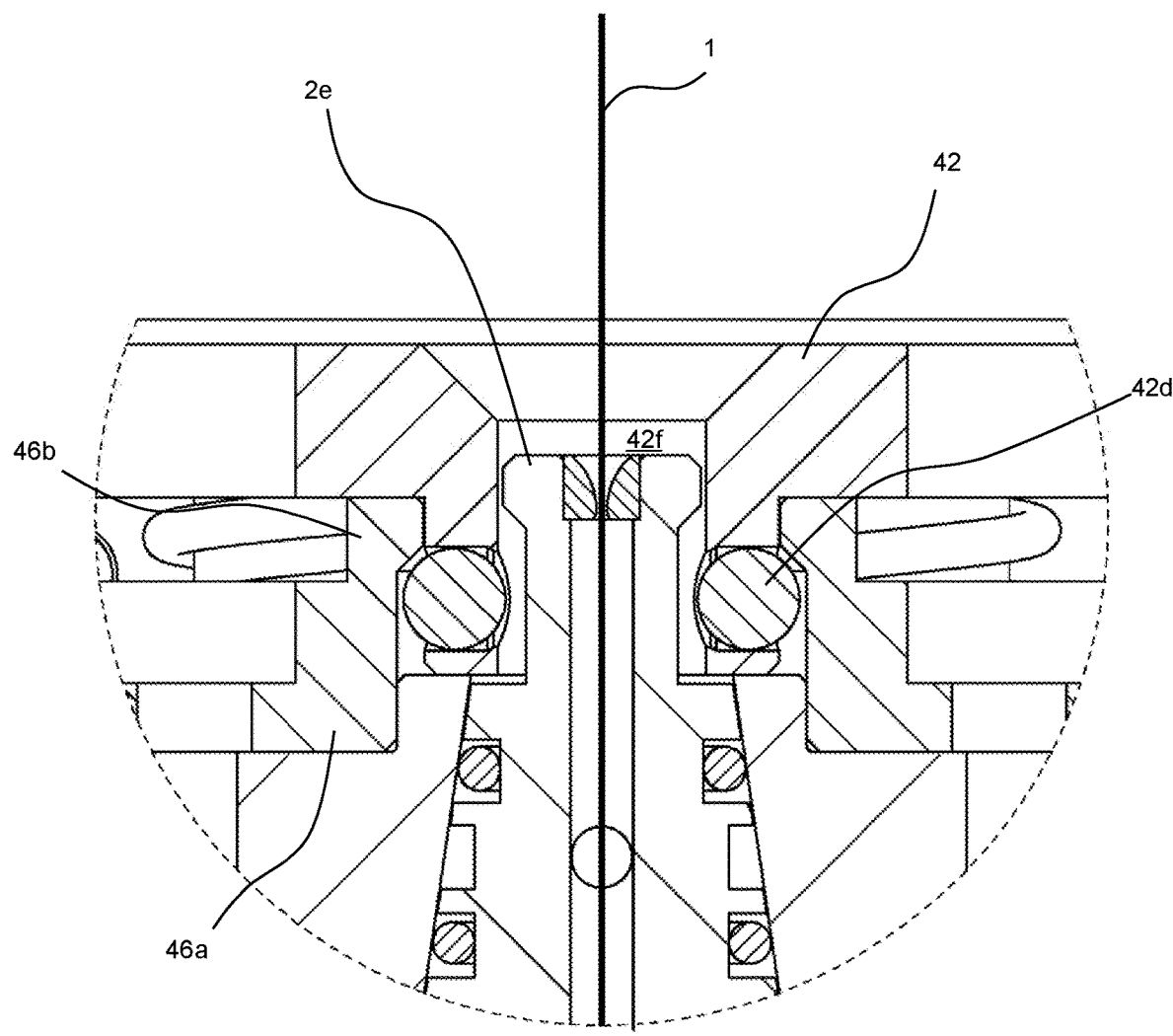
FIG. 13 is an enlarged view of a portion E in FIG. 12.

As shown in FIG. 13, the balls 42d move in the ball receiving space 46d and disengage from the bulged portion of the pull-stud portion 2e along with the vertically downward displacement of the displacement member 42. Consequently, the fixation of the electrode guide 2 to the pull-up mechanism 4 is released, and the electrode guide 2 can be removed from the lower guide unit 100. In the state of FIG. 11 to FIG. 13 where the electrode guide 2 can be removed from the lower guide unit 100, the position of the displacement member 42 is defined as a release position, and the position of the ball 42d is defined as a disengagement position.

2.3. Attachment of Electrode Guide 2

Next, an attachment method of the electrode guide 2 to the pull-up mechanism 4 is described. When the electrode guide 2 is attached, the tapered portion 2a of the electrode guide 2 is fitted into the fitting hole 3a of the housing 3 from below while the displacement member 42 is in the release position. As shown in FIG. 12 and FIG. 13, when the tapered portion 2a is fitted into the fitting hole 3a, at least a part of the pull-stud portion 2e is accommodated in the pull-stud receiving hole 42f of the displacement member 42. At this time, since the balls 42d are in the disengagement position, the electrode guide 2 is not fixed to the pull-up mechanism 4.

From this state, a force in the X+ direction is applied to the rear frame 45 by the power cylinder 49. When the rear frame 45 and the outer frame 43 are moved in the X+ direction along with the movement of the rod 49c, the links 48 are rotated clockwise, and the displacement member 42 is displaced to the restriction position, thereby returning to the state of FIG. 8 and FIG. 9.

The balls 42d in the disengagement position move to the engagement position in the ball receiving space 46d along with the displacement of the displacement member 42 from the release position to the restriction position and are sandwiched between the bulged portion of the pull-stud portion 2e and the inner surface of the cylindrical portion 46b of the positioning member 46, as shown in FIG. 10. Consequently, the electrode guide 2 is fixed to the pull-up mechanism 4.

As described above, in the pull-up mechanism 4 of the present embodiment, the links 48 are rotated by the power cylinder 49, so that the electrode guide 2 can be easily fixed and released. In addition, the horizontal force applied by the power cylinder 49 can be converted into a vertical force using the links 48 to displace the displacement member 42. Consequently, the power cylinder 49 can be arranged on the back surface side of the guide support 40, and it is possible to realize the lower guide unit 100 which is compact in the vertical direction.

2.4. Connection of Flow Channels when Attaching Electrode Guide 2

When the tapered portion 2a is fitted into the fitting hole 3a in attaching the electrode guide 2, the first flow path 9 and the first supply path 7 are connected via the first connection port 9a and the first supply path outlet 7a, and the second flow path 10 and the second supply path 8 are connected via the second connection port 10a and the second supply path outlet 8a, as shown in FIG. 4 and FIG. 6. Consequently, the flow channels of the working fluid and the compressed air formed in the electrode guide 2 and the housing 3 are respectively connected.

The position of the electrode guide 2 with respect of the housing 3 in a direction of the central axis of the electrode guide 2 is uniquely determined by fitting the tapered portion 2a into the fitting hole 3a. Further, since the first connection port 9a and the second connection port 10a comprise the annular concave portion extending along the circumferential direction of the tapered portion 2a, they can be connected respectively to the first supply path outlet 7a and the second supply path outlet 8a at any positions in the circumferential direction. Therefore, the flow path and the supply path can be connected more easily and reliably. The electric discharge machining can be performed by inserting and attaching the tool electrode 1 along the central axis of the electrode guide 2 while the electrode guide 2 is attached.

3. Mist Generation during Electrical Discharge Machining

Next, mist generation during electrical discharge machining is described.

As shown in FIG. 4, the compressed working fluid supplied from the working fluid supplying device 5 is ejected from the working fluid ejection groove 2c1 to the mist generation space 10e through the working fluid filling region 9c. The compressed working fluid is then mixed with the compressed gas in the mist generation space 10e to be atomized into a mist form and is ejected as mist along the tool electrode 1 from the ejection opening 2d. Consequently, machining chips in the vicinity of the portion to be machined can be efficiently removed.

When the working fluid is ejected in the mist form, it is preferable to generate the mist on a lower side of the lower guide unit 100 at a position closer to the portion to be machined. When the working fluid is mixed with the compressed air at a position farther from the portion to be machined, the generated mist may aggregate in the process of being transferred to the portion to be machined, and the size of the mist fine particles is increased, so that the effect of removing the machining chips is reduced. In the present embodiment, the first connection port 9a and the second connection port 10a are provided at different heights from each other, and both sides of each of the first connection port 9a and the second connection port 10a are sealed with the O-rings 14 along the tapered surface 2b of the tapered portion 2a. Consequently, the working fluid and the compressed gas leaking from the respective connection port can be prevented from being mixed with each other before reaching the mist generation space 10e, and it becomes possible to generate and stably transfer a high-quality mist to the vicinity of the portion to be machined.

4. Other Embodiments

Although the preferred embodiments of the present invention have been described above, the present invention is not limited to the above-mentioned embodiments. That is, various design changes can be made within the scope of the claims.

REFERENCE SIGN LIST

1: tool electrode, 2: electrode guide, 2a: tapered portion, 2b: tapered surface, 2c: die fixing portion, 2c1: working fluid ejection groove, 2d: ejection opening, 2e: pull-stud portion, 3: housing, 3a: fitting hole, 3b: tapered surface, 3c: biasing-member accommodating space, 3d: connection hole, 3e: fixing member, 4: pull-up mechanism, 5: working fluid supplying device, 6: compressed gas supplying device, 7: first supply path, 7a: first supply path outlet, 8: second supply path, 8a: second supply path outlet, 9: first flow path, 9a: first connection port, 9a1: first annular concave portion, 9a2: first opening, 9c: working fluid filling region, 10: second flow path, 10a: second connection port, 10a1: second annular concave portion, 10a2: second opening, 10e: mist generation space, 13: annular groove, 14: O-ring, 17a,17b, 17c: die, 40: guide support, 41: biasing member, 42: displacement member, 42a: flat plate portion, 42b: cylindrical portion, 42c: projection, 42d: ball, 42e: ball hole, 42f: pull-stud receiving hole, 42g: through hole, 43: outer frame, 43a: slot-shaped through hole, 43b: connection hole, 44: front frame, 45: rear frame, 45a: connection member, 45b: connection nut, 46: positioning member, 46a: flat plate portion, 46b: cylindrical portion, 46c: through hole, 46d: ball receiving space, 47: guide shaft, 48: link, 48a: arm portion, 48b: connection portion, 49: power cylinder, 49a: cylinder, 49b: piston, 49c: rod, 49d: joint block, 49d1: rod guiding hole, 49e: base, 100: lower guide unit, B: connection point, C: supporting point

The invention claimed is:

1. A lower guide unit configured to guide a vertically lower portion of a tool electrode in an electrical discharge machine for electrical discharge machining, comprising:
a housing comprising a fitting hole having a tapered surface,
an electrode guide comprising a tapered portion tapering upward, and
a pull-up mechanism comprising a guide support, a plurality of links, and a power cylinder,
wherein the guide support comprises at least one biasing member and a displacement member,
the biasing member is arranged to bias the displacement member in a vertical direction,
the displacement member is configured to be displaced in the vertical direction between a restriction position and a release position,
the links are arranged to interpose the guide support therebetween and are configured to be rotated by a force applied by the power cylinder,
the electrode guide is configured to be fixed to the guide support by a biasing force of the biasing member in a state where the tapered portion is fitted into the fitting hole when the displacement member is in the restriction position, and
the electrode guide is further configured to be released from the lower guide unit when the displacement member is displaced, along with rotation of the links, to the release position against the biasing force of the biasing member.

2. The lower guide unit of claim 1, wherein the guide support further comprises an outer frame arranged to sandwich the displacement member from sides where the links are arranged,
the outer frame comprises two slot-shaped through holes extending in a horizontal direction,
the displacement member comprises two projections each projecting to a side where the outer frame is arranged, and
the two projections are each inserted into the two slot-shaped through holes and are configured to be movable in the slot-shaped through holes along with displacement of the displacement member.

3. The lower guide unit of claim 1, wherein the electrode guide further comprises a pull-stud portion provided at an upper end,
the guide support comprises a plurality of balls,
the balls are configured to be movable, along with displacement of the displacement member, between an engagement position and a disengagement position in a ball receiving space formed inside the guide support,
the balls are configured to move to the engagement position to engage with the pull-stud portion when the displacement member is displaced to the restriction position, and
the balls are further configured to disengage from the pull-stud portion to move to the disengagement position when the displacement member is displaced to the release position.

4. The lower guide unit of claim 1, wherein the plurality of links comprises two pairs of parallel links.

5. The lower guide unit of claim 1, wherein at least a part of the biasing member is accommodated in a hole formed on an upper surface of the housing.

6. The lower guide unit of claim 1, wherein the at least one biasing member comprises four compression springs arranged in parallel.

7. The lower guide unit of claim 1, wherein the power cylinder is a double-acting cylinder configured to rotate the links by applying a horizontal force to the guide support.

8. The lower guide unit of claim 1, wherein the housing and the electrode comprise therein at least one flow channel for supplying working fluid or compressed gas.

* * * * *